(12) United States Patent
Kunter et al.

(10) Patent No.: US 12,330,928 B2
(45) Date of Patent: Jun. 17, 2025

(54) DISPENSING SYSTEM FOR DELIVERING AN OPERATING FLUID

(71) Applicant: ELAFLEX HIBY GMBH & CO. KG, Hamburg (DE)

(72) Inventors: Stefan Kunter, Hamburg (DE); Torben Schörck, Hamburg (DE); Jörg Duus, Hamburg (DE)

(73) Assignee: ELAFLEX HIBY GMBH &CO. KG, Hamburg (DE)

( * ) Notice: Subject to any disclaimer, the term of this patent is extended or adjusted under 35 U.S.C. 154(b) by 0 days.

(21) Appl. No.: 18/563,011

(22) PCT Filed: May 19, 2022

(86) PCT No.: PCT/EP2022/063566
§ 371 (c)(1),
(2) Date: Nov. 21, 2023

(87) PCT Pub. No.: WO2022/243428
PCT Pub. Date: Nov. 24, 2022

(65) Prior Publication Data
US 2024/0217804 A1 Jul. 4, 2024

(30) Foreign Application Priority Data
May 21, 2021 (EP) .................... 21175295

(51) Int. Cl.
*B67D 7/82* (2010.01)
*B67D 7/04* (2010.01)
(52) U.S. Cl.
CPC ................. *B67D 7/82* (2013.01); *B67D 7/04* (2013.01)

(58) Field of Classification Search
CPC . F16L 53/00; F16L 53/38; B67D 7/02; B67D 7/04; B67D 7/32; B67D 7/38; B67D 7/82
See application file for complete search history.

(56) References Cited

U.S. PATENT DOCUMENTS

| 5,381,511 A | 1/1995 | Bahar et al. |
| 6,996,337 B2 * | 2/2006 | Auber ............ F01N 3/2066 392/480 |

(Continued)

FOREIGN PATENT DOCUMENTS

| DE | 102011014520 | 9/2012 |
| EP | 3050842 | 8/2016 |

OTHER PUBLICATIONS

International Search Report, International Patent Application No. PCT/EP2022/063566, dated Aug. 29, 2022, 8 pages.

*Primary Examiner* — Timothy L Maust
(74) *Attorney, Agent, or Firm* — CASIMIR JONES, S.C.; Brian F. Bradley

(57) ABSTRACT

An assembly comprising a flexible hose (16) and a control unit (17), a heating wire (27, 28) being guided along an axial direction of the hose and embedded. The control unit is designed to deliver electrical power to the heating wire, in order to heat a medium conveyed by the dispensing hose or an outer surface of the hose. A dispensing system (13, 13') for delivering an aqueous urea solution and/or for delivering a compressed or liquefied gas. The dispensing system comprises a conveying device for the operating fluid, a dispensing valve (15) for discharging the operating fluid, and a flexible dispensing hose (16) which connects the conveying device to the dispensing valve to allow positioning of the dispensing valve on a filler neck of a vehicle tank.

25 Claims, 4 Drawing Sheets

(56) References Cited

U.S. PATENT DOCUMENTS

| | | | |
|---|---|---|---|
| 7,203,419 B2* | 4/2007 | Malone | F16L 53/38 |
| | | | 392/479 |
| 9,574,918 B2* | 2/2017 | Heiligenstein | F16L 53/38 |
| 9,764,938 B2* | 9/2017 | McClelland | F16L 53/32 |
| 9,802,811 B2* | 10/2017 | Larsson | B67D 7/80 |
| 2005/0063689 A1 | 3/2005 | Auber | |
| 2005/0274713 A1 | 12/2005 | Malone et al. | |
| 2016/0060096 A1 | 3/2016 | Larsson | |
| 2018/0124876 A1 | 5/2018 | Diebolt et al. | |

* cited by examiner

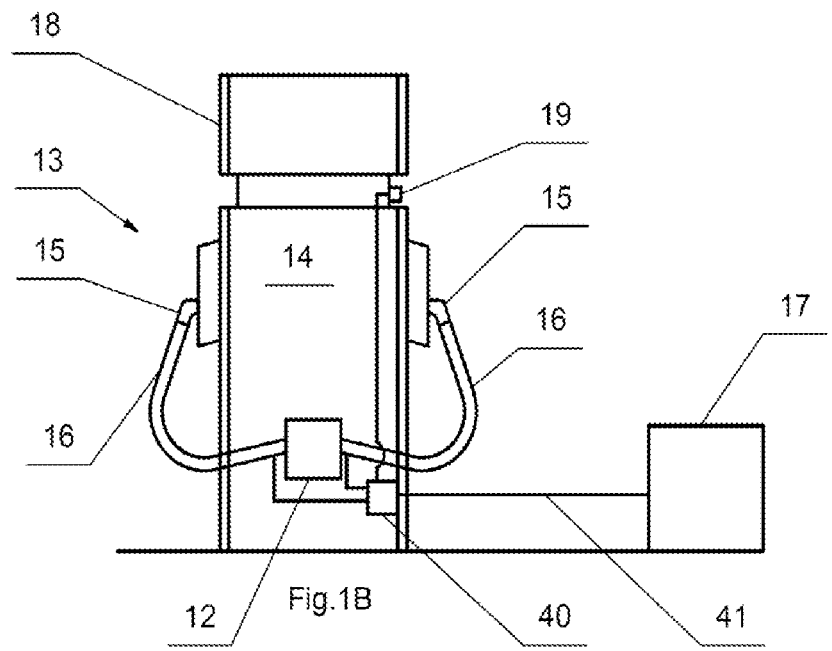
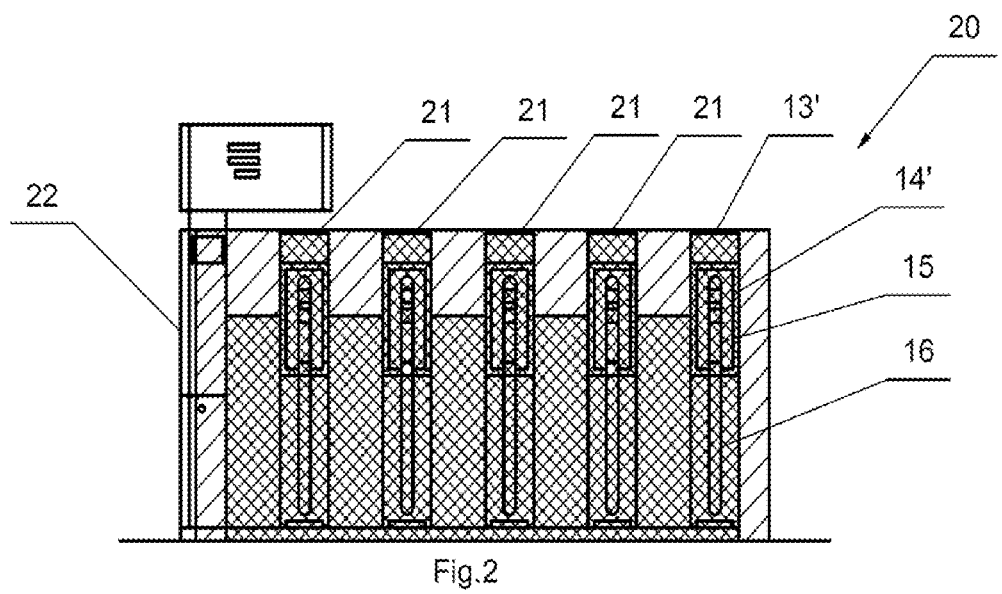

DISPENSING SYSTEM FOR DELIVERING AN OPERATING FLUID

The subject matter of the present application is a dispensing system for delivering an operating fluid, in particular for delivering an aqueous urea solution or for delivering a compressed or liquefied gas.

Modern internal combustion engines can be supplied with additional operating fluids in addition to the fuel in order to reduce the emission of noxious gases. In particular, modern diesel engines use what is referred to as SCR technology, in which the emission of nitrogen oxides is reduced by means of an aqueous urea solution, also known as "Adblue®". The additional operating fluids are consumed during operation, and therefore tanks for operating fluids in the vehicles have to be refilled regularly. For this purpose, there are usually separate operating fluid dispenser columns at filling stations.

Since the operating fluid Adblue® freezes at temperatures of just $-11°$ ° C., it is known in principle from the prior art to use heating devices, which are intended to prevent the operating fluid from freezing at cold ambient temperatures. For example, DE 10 2015 115 922 A1 proposes heating the interior of the fuel dispenser column housing in which an operating fluid tank is arranged, and also storing the fuel hose within the housing while it is not in use. It is also known from US 2016/0280532 A1 or WO 2014 113 277 A1 to provide additional line systems in the dispensing hose, through which a heated fluid is passed in order to heat the hose. WO 2012/015685 proposes adequately heating the operating fluid to be dispensed itself by means of a temperature control system and allowing it to flow through the dispensing hose with the aid of a circulation system, even when said hose is not in use.

A disadvantage of the previously known dispensing systems is that they generate a high level of effort as regards maintenance and operation and, in addition, their use can be complicated for the user. Moreover, previously known dispensing systems often have the problem that they do not meet the requirements for operation in a zone 1 or 2 according to ATEX Workplace Directive 1999/92/EC and therefore, for reasons of explosion protection, must not be installed next to fuel dispenser columns or within a multi-dispenser dispenser column with at least one fuel dispensing point.

Against this background, it is the object of the present invention to provide a dispensing system for delivering an operating fluid, in particular for delivering an aqueous urea solution, which at least partially avoids the abovementioned problems.

Accordingly, the present invention relates to a dispensing system for delivering an operating fluid, in particular for delivering an aqueous urea solution, comprising:
  a conveying device for the operating fluid,
  a dispensing valve for dispensing the operating fluid, and
  a flexible dispensing hose, which connects the conveying device to the dispensing valve in order to allow the dispensing valve to be positioned on a filler neck of a vehicle tank or on an operating fluid container.

According to the invention, the dispensing hose has a hose wall into which a heating wire routed along an axial direction of the dispensing hose is embedded, wherein the dispensing hose and the dispensing valve are configured to be operated in a zone 2 according to ATEX Workplace Directive 1999/92/EC. Furthermore, the dispensing system has an installation space which is designed to be zone-free and a control unit, which is positioned in this installation space and is configured to output electric power to the heating wire in order to heat an outer surface of the dispensing hose and/or an operating fluid conveyed through the dispensing hose.

First of all, some terms used in the context of the invention will be explained. A zone 0 according to ATEX Workplace Directive 1999/92/EC is a region in which there is an explosive atmosphere in the form of a mixture of air and flammable gases, vapors or mist constantly, over long periods of time or frequently. The term zone 1 according to ATEX Workplace Directive 1999/92/EC refers to a region in which, during normal operation, an explosive atmosphere in the form of a mixture of air and flammable gases, vapors or mist may occasionally form. A zone 2 according to ATEX Workplace Directive 1999/92/EC is a region in which an explosive atmosphere in the form of a mixture of air and flammable gases, vapors or mist normally does not occur or occurs only for a short time during normal operation. These definitions correspond to the definitions in Annex I, Number 2 of Directive 1999/92/EC.

The term "explosive atmosphere" is used in accordance with Directive 2014/34/EU, Article 2, No. 4 and designates a mixture of air and combustible gases, vapors, mist or dust under atmospheric conditions in which, after ignition has taken place, the combustion process spreads to the entire unburnt mixture.

If, in the context of the invention, a device is configured to be operated in a zone 0 according to ATEX Workplace Directive 1999/92/EC (also referred to below as ATEX zone 0), this is equivalent to the device meeting the requirements of Directive 2014/34/EU, which are imposed on Equipment group II, Equipment category 1 (see Annex I, section 2 a) of Directive 2014/34/EU). If, in the context of the invention, a device is configured to be operated in a zone 1 according to ATEX Workplace Directive 1999/92/EC (referred to below as ATEX zone 1), this is equivalent to the device meeting the requirements of Directive 2014/34/EU, which are imposed on Equipment group II, Equipment category 2 (see Annex I, section 2 b) of Directive 2014/34/EU). If, in the context of the invention, a device is configured to be operated in a zone 2 according to ATEX Workplace Directive 1999/92/EC (also referred to below as ATEX zone 2), this is equivalent to the device meeting the requirements of Directive 2014/34/EU, which are imposed on Equipment group II, Equipment category 3 (see Annex I, section 2 c) of Directive 2014/34/EU).

In the case of a fuel dispenser column, the spatial position of zone 0, zone 1 and zone 2 as well as the requirements on equipment that is operated in these zones are clearly defined by ATEX Workplace Directives 1999/92/EC and 2014/34/EU. If the dispensing hose and the dispensing valve of the dispensing system according to the invention are configured to be operated in one of said zones according to ATEX Workplace Directive 1999/92/EC, this means that the dispensing system according to the invention can be operated next to a fuel dispenser column or indeed integrated into a multi-dispenser dispensing system while complying with the directive, even if the dispensing hose and/or the dispensing valve can be moved into this zone of the fuel dispenser column or multi-dispenser dispensing system during the use of the system (e.g. during a tank filling process). Since the requirements for operation in a zone 0 are stricter than the requirements for operation in a zone 1 and the latter, in turn, are stricter than the requirements for operation in a zone 2, devices configured for operation in a higher ranking zone can also be operated in a lower ranking zone while complying with the directive.

The installation space of the dispensing system according to the invention is of zone-free design. This means that the installation space is free from an ATEX zone even if the dispensing system is positioned in such a way that the dispensing hose and/or the dispensing valve are/is located in an ATEX zone (zone 0, 1 or 2) or can be moved into this zone. Thus, the installation space is designed to provide shielding with respect to such a zone. For example, the installation space can be integrated into a housing of the dispensing system, wherein the housing can be shielded from the surroundings by design measures, thus preventing or reducing the entry of an explosive atmosphere into the housing and/or ensuring, by adequate ventilation measures, that any explosive vapors that enter are diluted to such an extent that an explosive atmosphere cannot form within the housing. It is also possible for there to be, within the housing, a zone-free partial housing in which the installation space is arranged. In this case, it is not necessary to design the entire housing of the dispensing system to be zone-free.

As an alternative, the installation space can also be positioned at a distance from the dispensing hose and/or dispensing valve, thus ensuring that a zone situated in the region of the dispensing hose and/or dispensing valve has no effect on the installation space by reason of the distance alone. The installation space can be arranged in a filling station building situated next to the dispensing system or even below ground, wherein in this case the heating wire and the control unit can be connected to one another by a cable for the transmission of the electric power.

The heating wire consists of an electrically conductive material which heats up in accordance with Joule's law of heating when an electric current flows through the heating wire. An electrical resistance of the heating wire can be in a range between 0.01 and 2 ohm/m, preferably between 0.05 and 1 ohm/m, as a further preference between 0.1 and 0.5 ohm/m, for example. The heating wire can comprise or consist of a resistance alloy according to DIN 17471 (e.g. a CrFeNi alloy or a CrFeAl alloy), for example, or can comprise or consist of a semiconductor material (e.g. silicon carbide, molybdenum disilicide or graphite). In respect of its electrical resistance, the heating wire preferably has a temperature coefficient that is only slightly positive. For example, the temperature coefficient can be less than 10%/K, preferably less than 5%/K, as a further preference less than 1%/K. Alternatively, the temperature coefficient can also be negative: it may therefore be an NTC thermistor.

If the heating wire is embedded in the hose wall, this means that the heating wire is completely surrounded by the flexible wall material of the dispensing hose. For example, the heating wire can be wound onto a prefabricated inner hose (e.g. one produced by extrusion), ensuring that it rests securely on the inner hose. A thermoplastic sheet can then be laid circumferentially around the inner hose, for example, and the heating wire wound onto the latter, after which a connection between the inner hose and the plastic sheet is produced by vulcanization, leading to the heating wire being completely surrounded by the plastic material of the inner hose and/or of the plastic sheet. The semifinished hose obtained in this way can then be surrounded with an outer hose by means of extrusion. To increase stability, reinforcing braids can be inserted between the inner hose and the plastic sheet and/or between the plastic sheet and the outer hose. The heating wire can also be embedded into the dispensing hose in some other way that is fundamentally known from the prior art. The hose with the heating wire embedded therein is also referred to below as a heated hose. The heating wire can be configured to output a heating power, based on the length of the dispensing hose, which is between 5 and 200 W/m, preferably between 10 and 100 W/m, or as a further preference between 20 and 70 W/m.

It is preferred that the dispensing hose connects the dispensing valve directly to the conveying device. It is then possible to ensure that the operating fluid is heated within the dispensing hose immediately after emerging from the conveying device. In principle, it is also possible for the dispensing hose to be connected to a connection coupling which is situated on the housing or within the housing of the dispensing system and is, in turn, connected to the conveying device by means of a fluid line.

In the context of the invention, it has been recognized that, by means of the two measures—embedding the heating wire into the dispensing hose and arranging the control unit within the zone-free installation space—it is possible to make the system suitable for operation in the environment of an ATEX zone and to do so in a particularly economical and safe way. In particular, the positioning of the control unit within the zone-free installation space has the effect that the control unit itself is then arranged outside an ATEX zone if the dispensing system is situated in the direct vicinity or within such an ATEX zone. It is therefore not necessary for the control unit itself to be configured and authorized for operation in an ATEX zone.

Moreover, further advantages are achieved in an economical and failsafe manner through the embedding of the heating wire within the wall of the dispensing hose. On the one hand, the heating wire is protected from mechanical influences (e.g. shocks) during the operation of the system. In this way, mechanical damage to the heating wire, which is fundamentally associated with the risk of sparking when the heating wire is supplied with electric power, is reliably avoided. On the other hand, embedding the heating wire protects it from an explosive atmosphere that may be present in the surroundings. Even if mechanical damage occurs to the heating wire (e.g. a breakage or short circuit), there is still a high degree of safety since the risk of contact with the potentially explosive environment is avoided or at least significantly reduced even in this case through the embedding of the heating wire in the dispensing hose.

In the context of the invention, it has furthermore been realized that the dispensing system according to the invention develops particular advantages if it is used to dispense a gas, in particular a compressed or liquefied gas or gas mixture. Thus, the operating fluid can also comprise or consist of such a compressed or liquefied gas. For example, the operating fluid can comprise or consist of liquefied petroleum gas (LPG), liquefied natural gas (LNG) or liquefied hydrogen. Owing to the low temperature of the liquefied gas, there is severe cooling of the dispensing hose as it is dispensed, and this can lead to an outer surface of the dispensing hose icing up on account of atmospheric humidity present in the surroundings. During the dispensing of a compressed gas too, icing may occur under certain circumstances on account of the cold of expansion. Icing makes the dispensing hose and the dispensing valve connected thereto considerably more difficult to handle and must therefore be removed with some effort in the prior art. With the aid of the heating wire embedded in the dispensing hose, the dispensing hose can be heated and deiced in a simple and reliable manner.

The dispensing hose can have an inner hose designed for the passage of the operating fluid. The inner hose can be surrounded by an outer hose, into which the heating wire is embedded. The outer hose can be a flexible plastic hose. The outer hose with the heating wire embedded therein can be produced in the manner already described above. The outer hose with the heating wire embedded therein is subsequently also referred to below as a heated hose.

The use of an inner hose with a heated hose surrounding it is advantageous, for example, when the operating fluid is a cold medium that is at a temperature significantly below 0° ° C. Significantly below 0° ° C. means that the temperature can be less than −10° C., less than −30° C. or even less than −50° C. In particular, the cold medium can be at a temperature in a range between −10° ° C. and −273.15° ° C. In particular, the medium can be a compressed and/or liquefied gas. The inner hose can be configured to be pressure-resistant in a pressure range of more than 4 bar, preferably of more than 6 bar. A bursting pressure of the inner hose can be more than 25 bar, preferably more than 30 bar, as a further preference more than 35 bar. Furthermore, the inner hose can be designed to be temperature-stable in a temperature range of less than −100° ° C., preferably less than −140° C. The inner hose can be designed for operation in a temperature range between −100° C. and −273.15° ° C., for example. In this context, the temperature data relate to the medium transported by the inner hose. When using the inner hose for the passage of liquefied natural gas (LNG), the inner hose can be designed for operation in a temperature range between −100° C. and −210° ° C. When using the inner hose to dispense liquid hydrogen, the inner hose can be designed for operation in a temperature range between −220° C. and −273.15° C. In particular, the temperature stability and/or pressure resistance of the dispensing hose can be defined in accordance with at least one of the requirements stated in DIN EN ISO 12617, DIN EN ISO 16924, ISO 21012, or ISO 20519. The inner hose can comprise or consist of a plurality of plies or layers and/or can comprise or consist of a composite material. In particular, the inner hose can comprise reinforcing plies, e.g. a braid or a woven fabric. A reinforcing ply can comprise a woven metal, for example. In particular, the inner hose can be designed as a corrugated metal hose or can comprise a corrugated metal hose.

The inner hose and the heated hose surrounding the inner hose together form the dispensing hose. The heated hose can likewise comprise a plurality of plies or layers and/or a composite material, in particular reinforcing fibers. In a preferred embodiment, the heated hose comprises one or more of the materials selected from the group comprising polyethylene (PE), ethylene-propylene-diene (monomer) rubber (EPDM), styrene-butadiene rubber (SBR), acrylonitrile-butadiene rubber (NBR), polyvinylchloride (PVC) and chloroprene rubber (CR).

Since the heated hose surrounds the inner hose, the inner hose carrying the cold medium (e.g. the compressed and/or liquefied gas) is shielded to a certain degree from the ambient air, and therefore atmospheric humidity present in the ambient air is already hindered to a certain extent from settling on the inner hose and freezing solid. However, full airtight shielding or insulation of the inner hose is very expensive, and therefore, despite the outer hose, icing of the inner hose can usually take place and, furthermore, cold can be transmitted from the inner hose to the outer hose. With the aid of the heating wire embedded into the outer hose, it is possible to counteract both icing of the inner hose and icing of the outer hose.

It has been found that it is possible with the aid of the heated hose according to the invention to significantly increase the life of a dispensing hose that has a corrugated metal hose as an inner hose, for example. In the prior art, the icing of such corrugated metal hoses significantly restricted the mobility of the dispensing hose, and this made it significantly more difficult to connect the dispensing hose to a tank filler neck during a tank filling process. In the prior art, this regularly led to the need for large forces to be exerted by the user to connect the iced corrugated metal hose to a tank filler neck or to release it from the tank filler neck, in order to at least partially break the ice layer and increase mobility. By the very nature of the case, this was associated with high mechanical stress on the corrugated metal hose and often led to premature destruction of the corrugated metal hose. Moreover, the low temperatures prevailing at the outer surface of the corrugated metal hose necessitated expensive safety measures in the prior art in order to prevent users from suffering freeze burns through contact with the outer surface. In contrast, the dispensing hose according to the invention makes it possible to significantly increase the life of the inner hose and makes it simpler and safer to operate for the user.

The heated hose can rest directly on the medium-carrying inner hose, or there can be an interspace between the inner hose and the heated hose. The interspace can be evacuated or filled with air or some other material. Between the inner hose and the outer hose it is also possible to arrange an intermediate hose, which is configured to limit a maximum bending angle of the dispensing hose. For this purpose, it is possible, in particular, for the intermediate hose to have a plurality of hose segments, which are each interlocked with adjacent hose segments. A hose of this kind is known, for example, from US 2001/0015233 A1 and is also referred to as a FloppyGuard™.

The idea of fitting a dispensing system for delivering a cold medium, in particular for delivering a compressed and/or liquefied gas, with the above-described dispensing hose that has an inner hose designed for the passage of the medium and an outer heated hose has independent inventive significance. In particular, it is not necessary with such a dispensing system for the dispensing hose and the dispensing valve to be configured to be operated in a zone 2 according to ATEX Workplace Directive 1999/92/EC. It is also not necessary for the dispensing system to have an installation space which is designed to be zone-free and in which the control unit is positioned.

The dispensing hose too, which comprises an inner hose for the passage of the medium, in particular of the compressed and/or liquefied gas, and a heated hose as described above, may in itself already have independent inventive significance. In particular, it is thus not necessary, in order to implement the invention, to provide a dispensing system having a conveying device, a dispensing valve and a control unit. The dispensing hose according to the invention can be further developed by additional features which, in the present case, are described in connection with the dispensing system according to the invention and the assembly according to the invention.

Finally, as already mentioned above, the invention is not limited to dispensing hoses for the passage of a compressed or liquefied gas. In one embodiment, the dispensing hose or the inner hose can be designed for the passage of any desired medium. Particularly during the passage of media which are at a low temperature, it is possible with the aid of the dispensing hose according to the invention to reduce or avoid the risk of icing and in this way to increase the safety and mobility of the hose.

The dispensing valve and/or the dispensing hose can be configured to be operated in a zone 1 according to ATEX Workplace Directive 1999/92/EC. It is also possible for the dispensing valve to be configured to be operated in a zone 0 according to ATEX Workplace Directive 1999/92/EC. In this case, the dispensing valve and the dispensing hose can be moved into the zone 0, i.e. into a zone with a high risk of explosion, thus enabling the dispensing system according to the invention to be positioned in an even more flexible manner.

In an advantageous embodiment, the dispensing system has a housing. The housing can be an independent housing of a dispenser column and can be set up next to a fuel dispenser column, for example. As an alternative, it is also possible for the housing to be part of the housing of a multi-dispenser dispensing system having at least one fuel dispensing point. The installation space can be arranged within the housing, wherein the interior of the housing can be of completely zone-free design. Alternatively, the housing can contain a zone-free partial region in which the installation space is arranged.

In a preferred embodiment, the heating wire has two wire sections, which run along the axial direction of the dispensing hose, which are connected to the control unit on the conveying device side and which are short-circuited to one another on the dispensing valve side. It has been found that this configuration significantly simplifies the production of the dispensing hose and the embedding of the heating wires since, during hose production, both wire sections can be passed simultaneously along the hose and it is not necessary, after passing the wire along from the start of the hose to the end of the hose, to pass it back to the start of the hose. In this case, the two wire sections can be passed around the hose axis at a distance from one another in the longitudinal direction of the hose, e.g. parallel to one another in the manner of a double helix.

The two wire sections can be passed out of the dispensing hose to the outside on the dispensing valve side and can be short-circuited to one another outside the dispensing hose. When two wire sections are used, the production of the short circuit of the two wire sections is a critical process which must be carried out carefully to enable the formation of sparks to be avoided precisely in the region of the dispensing valve. It has been found that passing the heating wire out of the dispensing hose ensures reliable access to the ends of the wire sections and enables the ends to be connected to one another in an electrically conductive manner with appropriate safety. The wire ends can be connected to one another by means of an electrically conductive clamping device, for example.

The two sections are preferably passed out of the dispensing hose to the outside on the conveying device side and routed to the control unit outside the dispensing hose. This configuration makes it possible to route the wire sections safely to the control unit outside the hose. This means it is not necessary to modify a connection coupling, which serves to connect the dispensing hose to the housing, in such a way that the wire sections are routed within the connection coupling.

In one embodiment, the dispensing system can have a tank filling signal transmitter for detecting a tank filling process and for outputting a tank filling signal to the control unit. The tank filling signal transmitter is configured to determine whether dispensing of the operating fluid is taking place. For example, it can determine whether the conveying device is in operation. If dispensing is taking place, the tank filling signal transmitter outputs a tank filling signal to the control unit, which in response can output electric power to the heating wire. Activation of the heated hose initiated by a tank filling signal is advantageous particularly when dispensing a compressed or liquefied gas since, in this case, it is necessary to counteract icing precisely when the dispensing system is in operation. The control unit is preferably designed, upon receiving the tank filling signal, to determine a power value, taking into account a length of the dispensing hose, and to output a corresponding power to the heating wire. As a further preference, the control unit is designed to access a database, in which power values for different lengths of the dispensing hose are stored, in order to determine the power value. The database can be stored in the control unit. Here, the term "database" should be understood broadly. In particular, hardware-based coding of the data is also possible, and the use of database software or the like is not necessary. In this way, the determination of a heating power required for adequate heating of the dispensing hose is significantly simplified.

Provision can be made for the tank filling signal transmitter also to output a tank filling signal to the control unit on completion of a tank filling process, the control unit preferably being configured to switch off the power output within a predetermined period of time after receiving the tank filling signal.

The dispensing system can furthermore have an atmospheric humidity sensor connected to the control unit and/or a temperature sensor connected to the control unit, wherein the control unit is designed to take into account a measured temperature and/or a measured atmospheric humidity when determining the power value output to the heating wire. For this purpose, the database can have corresponding power values for different temperatures and/or atmospheric humidity values. During the dispensing of a compressed or liquefied gas, the icing of the dispensing hose is affected by the ambient temperature and, in particular, also by the atmospheric humidity in the surroundings, and therefore the above features enable the heating power to be adapted significantly better to the actual requirements.

In one embodiment, in particular when dispensing liquid urea, the dispensing system has a temperature sensor for determining an ambient temperature of the dispensing system, wherein a signal output of the temperature sensor is connected to the control unit. Given a knowledge of the outside temperature, the electric heating power output by the control unit can be adapted in accordance with the actual heating requirement.

The control unit is preferably designed to determine a power value, taking into account a length of the dispensing hose and the ambient temperature, and to output a corresponding electric power to the heating wire. The control unit can furthermore be designed to access a database, in which power values for different temperatures and hose lengths are stored, in order to determine the power value. The database can be stored in the control unit. Here, the term "database" should be understood broadly. In particular, hardware-based coding of the data is also possible, and the use of database software or the like is not necessary. In this way, the determination of a heating power required for adequate heating of the dispensing hose is significantly simplified. The control unit can be designed to output electric power to the heating wire only when the ambient temperature falls below a threshold value, which can be 5° C. for example. The threshold value can be correspondingly stored in the database.

In one advantageous embodiment, provision can be made for the control unit to have an input device for presetting a length of the dispensing hose. If the heating wire material, the heating wire cross section and the manner in which the heating wire is routed along the dispensing hose are predetermined, the electrical resistance of the heating wire is substantially determined by the length of the dispensing hose (and to a lesser extent by the ambient temperature). The above-described features thus have the advantage that all that is required for the commissioning of the dispensing system is the one-time setting of the existing hose length of the dispensing hose by means of the input device. This input is a simple matter and can be verified by an operator simply by visual inspection of the dispensing hose. By accessing the database, the control unit can then autonomously output a suitable heating power to the heating wire for each ambient temperature and/or for each atmospheric humidity value. Operating errors, which can arise during manual input of a temperature- or atmospheric humidity-dependent heating power curve for example, are thereby avoided.

Provision can be made for the control unit to be configured to output a power to the heating wire as soon as a predetermined ambient temperature is undershot or as soon as a tank filling signal is received. Given a fixed ambient temperature, provision can be made for the database to contain presets for a change in the power in the course of time. Moreover, provision can be made for the power output to be adapted in accordance with the power values stored in the database when there is a change in the ambient temperature.

Since the start of power output and the adaptation of the power output are completely determined by the power values stored in the database, the susceptibility to errors of the system according to the invention can be significantly reduced. In creating the database, all the influencing variables which affect the conversion of the electric power into heat energy (e.g. a change in the electrical resistance of the heating wire as a function of the temperature, heat capacity and thermal conductivity of the hose, the speed of flow of the operating fluid) have preferably been taken into account. Apart from an initial input of the hose length, no adjustments to the control unit are therefore necessary. Operating errors can thereby be excluded.

In one embodiment, the control unit comprises a safety module, which is designed to switch off the power output to the heating wire if a safety-relevant event occurs (safety shutdown). In particular, the safety module can be designed to measure at least one actual electrical variable of the heating wire, to determine a deviation between the measured actual variable and a predetermined setpoint variable, and to switch off the power output to the heating wire if the actual variable deviates from the setpoint variable. The shutdown can be performed, for example, if the deviation of the actual variable from the setpoint variable exceeds a predetermined extent. The deviation of an actual variable from a corresponding setpoint variable thus represents a safety-relevant event.

The safety module is preferably designed to access a correlation table, in which respectively associated setpoint variables of the heating wire are stored for different total lengths of the dispensing hose and optionally for different ambient temperatures, in order to determine the setpoint variable. Like the database, the correlation table can also be formed by hardware-based coding of data.

The actual electrical variable can be a current flowing through the heating wire and/or a voltage applied to the heating wire and/or the electrical resistance of the heating wire. Alternatively or in addition, the actual electrical variable can be a fault current flowing from the heating wire to a ground system.

The safety module is preferably configured to monitor all of the abovementioned actual electrical variables, which are thus given by a current flowing through the heating wire, a voltage applied to the heating wire, and a fault current flowing from the heating wire to a ground system, wherein the safety module is designed to switch off the power output to the heating wire if one of the actual variables deviates from the corresponding setpoint variable.

The safety module can furthermore be configured to determine a supply voltage supplied to the control unit by a supply network and to switch off the power output to the heating wire in the event of a deviation of the determined supply voltage from a setpoint value (or a setpoint value range). The safety module can furthermore be configured to monitor a temperature value determined by the temperature sensor in order to determine an ambient temperature of the dispensing system, and to switch off the power output to the heating wire if the temperature value is outside a predetermined temperature range (e.g. −70° ° C. and)+70° ° C. Deviations in the above-described temperature and the supply voltage from corresponding setpoint values (or setpoint value ranges) can likewise represent illustrative safety-relevant events.

By means of the above-described safety module, it is possible to safely perform a safety shutdown of the electric power output in the case of all relevant types of fault (especially in the case of short circuits between heating wire sections or to ground, cable breaks, a faulty voltage supply or malfunctions of the temperature sensor), thus making it possible to minimize or even completely eliminate the risk of sparking in the event of a fault. In particular, a short circuit fault (which occurs in addition to a short circuit between the wire sections which may be present in any case) at a given power output leads to a higher current and a lower voltage than expected being measured, leading to a shutdown of the power output. In the case of a cable break, too little or even no more current flows through the heating wire, which likewise triggers a shutdown. Finally, incorrect setting of the hose length has the effect that both the current and the voltage are too low or too high (depending on whether the actual hose length deviates upward or downward from the set hose length), thus ensuring that the safety shutdown can take place in this case too.

In one preferred embodiment, the safety module has a normal mode, in which a power output to the heating wire is possible, and a fault mode, in which the power output is blocked. The safety module and/or the control unit are/is preferably designed to switch the safety module from the normal mode to the fault mode after a safety shutdown. Owing to the blocking of the power output in the fault mode, power output can take place only after the safety module has been reset from the fault mode to the normal mode. For resetting the safety module, there is preferably a manual reset device, which can be formed by a manual reset button for example. In this way, it is possible to ensure that operation of the heating wire after a safety shutdown can be continued only when the reset device has been actuated, e.g. manually by a service technician. Before resetting, the service technician should check the dispensing system, identify the fault that has triggered the shutdown, and eliminate said fault if possible.

The control unit can have a power output module which is designed to determine the power value and to output a corresponding electric power to the heating wire, wherein the power output module and the safety module are designed to exchange check signals, and wherein the power output module and/or the safety module are/is designed to switch off the power output to the heating wire if no check signal is received within a predetermined period of time. The failure to receive a check signal thus likewise represents a safety-relevant event.

In one preferred embodiment, the control unit is connected to a supply network and is galvanically isolated from the supply network. The galvanic isolation ensures that fluctuations in the electric power variables that occur in the supply network do not affect the heating wire or at least affect it to a reduced extent.

An inside diameter of the dispensing hose can be between 10 mm and 30 mm, preferably between 15 mm and 25 mm. In a particularly preferred embodiment, the diameter is 16 mm or 21 mm. A length of the dispensing hose is preferably less than 6 m and can be between 1 m and 6 m, for example.

The present invention furthermore relates to an assembly comprising a fuel dispensing point and a dispensing system according to the invention, arranged next to the fuel dispensing point, for delivering an operating fluid. The assembly has a zone 2 according to ATEX Workplace Directive 1999/92/EC, wherein the dispensing hose and/or the dispensing valve of the dispensing system according to the invention are/is designed to be movable into zone 2, and wherein the control unit is arranged outside a zone according to ATEX Workplace Directive 1999/92/EC. The assembly can be further developed by additional features which have been described above in connection with the dispensing system according to the invention for delivering an operating fluid. In particular, the assembly can also have a zone 1 and/or a zone 0, into which the dispensing hose and/or the dispensing valve of the dispensing system according to the invention can be moved. Here, the respective ATEX zone is caused by the fuel dispensing point. Since the control unit according to the invention is arranged in the installation space of zone-free design, the control unit itself does not need to be designed for operation in an ATEX zone.

In one embodiment, the dispensing system furthermore comprises a thermal fuse that is in thermal contact with the heating wire and is configured to interrupt a current flow through the heating wire if a temperature of the thermal fuse exceeds a limit value. The thermal fuse can be in direct mechanical contact with the heating wire. The thermal fuse can also be in indirect thermal contact with the heating wire. For example, the thermal fuse can be embedded into the heated hose (that is to say, for example, can be surrounded by the plastic material of the heated hose) or can be in mechanical contact with a surface of the heated hose. In one embodiment, the thermal fuse is situated in a region outside a zone 0, preferably outside a zone 1, as a further preference outside a zone 2 according to ATEX Working Directive 1999/92/EC. For this purpose, the thermal fuse can, in particular, be positioned on a section of the heating wire that is passed out of the dispensing hose on the conveying device side. The thermal fuse is preferably situated within an installation space of zone-free design (e.g. in the installation space in which the control unit is also positioned), which can be situated in a housing of the dispensing system.

Furthermore, the thermal fuse can comprise a switching element, integrated into one wire section of the heating wire, for interrupting a current flow through the heating wire. The thermal fuse is preferably formed independently and separately from the control unit or safety module. Moreover, the thermal fuse is preferably independent of a power supply of the control unit or safety module. The thermal fuse can be of irreversible design, and in this case, therefore, it can no longer be reset to a conductive state after a shutdown process. It is also possible for the thermal fuse to be reset to a conductive state exclusively by means of a specific reset device. Provision can be made for a reset device of this kind to be made available only to trained service personnel who, when the thermal fuse is triggered, can perform a thorough investigation of the cause of the fault that has led to the triggering of the thermal fuse.

The dispensing system of the assembly according to the invention can be designed as an independent dispenser column, wherein the fuel dispensing point can be designed as an independent fuel dispenser column which is set up next to the dispensing system. Alternatively, the assembly can be designed as a multi-dispenser dispensing system, wherein the fuel dispensing point and the dispensing system according to the invention are designed as part of the multi-dispenser dispensing system.

The invention furthermore relates to an assembly comprising a flexible hose for the passage of a medium, and a control unit for outputting electric power. The hose has an inlet, an outlet and a hose wall, into which a heating wire routed along an axial direction of the hose is embedded. The control unit is configured to output electric power to the heating wire in order to heat an outer surface of the hose and/or an operating fluid conveyed through the hose. The assembly according to the invention can be further developed by additional features which have been described above in connection with the dispensing system according to the invention and the assembly according to the invention. In particular, the hose can have additional features which have been described above in connection with the dispensing hose according to the invention.

In the context of the invention, it has been recognized that the above-described advantages are not limited to the area of application of a dispensing system but are also obtained in the case of a general-purpose hose for the passage of a medium. The medium can be, for example, a chemical whose temperature must be controlled while it is being conveyed through the hose in order, for example, to avoid freezing, impairment of the quality, or else some other change in the chemical or physical properties (e.g. viscosity) of the chemical.

In the case where the medium is at a low temperature, the outer surface of the hose can furthermore be heated with the aid of the heating wire and of the control unit in order to avoid settling and freezing of atmospheric humidity, to simplify the handling of the hose and increase safety for a user.

In one embodiment, the heating wire has two wire sections, which run along the axial direction of the hose, which are connected to the control unit on the inlet side, and which are passed out of the hose to the outside on the outlet side and are short-circuited to one another outside the hose. Particularly when conveying explosive or flammable media, this configuration has a high level of safety and reliability.

The assembly can furthermore be designed to determine a power value, taking into account a length of the hose, and to output a corresponding power to the heating wire. The control unit is preferably designed to access a database, in which power values for different lengths of the hose are stored, in order to determine the power value. The control unit can furthermore have an input device for presetting a length of the hose.

In one advantageous embodiment, the assembly furthermore has a temperature sensor for determining an ambient temperature, wherein a signal output of the temperature sensor is connected to the control unit, wherein the control unit is configured to determine a power value, taking into account the ambient temperature, and to output a corresponding power to the heating wire, wherein the control unit is preferably designed to access a database, in which power values for different ambient temperatures are stored, in order to determine the power value.

In one embodiment, the assembly furthermore comprises a conveying signal transmitter, which is designed to detect a conveying process and to output a conveying signal to the control unit. The conveying signal transmitter can be designed for monitoring the operation of a conveying device for the medium, for example. Alternatively, the conveying signal transmitter can also be designed for measuring a flow rate through the hose. The control unit can furthermore be designed to determine a power value when the conveying signal is received, preferably taking into account a length of the hose, and to output a corresponding power to the heating wire, wherein the control unit is, as a further preference, designed to access a database, in which power values for different lengths of the hose are stored, in order to determine the power value.

The hose can have an inner hose, which carries the medium, and an outer hose, which surrounds the inner hose, wherein the outer hose comprises the hose wall into which the heating wire is embedded. Furthermore, the medium can be a compressed and/or liquefied gas. Alternatively, the medium can also be an aqueous urea solution.

The invention is explained by way of example below by means of an illustrative embodiment with reference to the attached drawings. In the drawings:

FIG. 1: shows a dispensing system according to the invention for delivering an operating fluid in a side view;

FIG. 1A: shows a further embodiment of a dispensing system according to the invention for delivering an operating fluid in a side view;

FIG. 1B: shows a further embodiment of a dispensing system according to the invention for delivering an operating fluid in a side view;

FIG. 2: shows a multi-dispenser dispensing system according to the invention in a side view;

Figure 5:
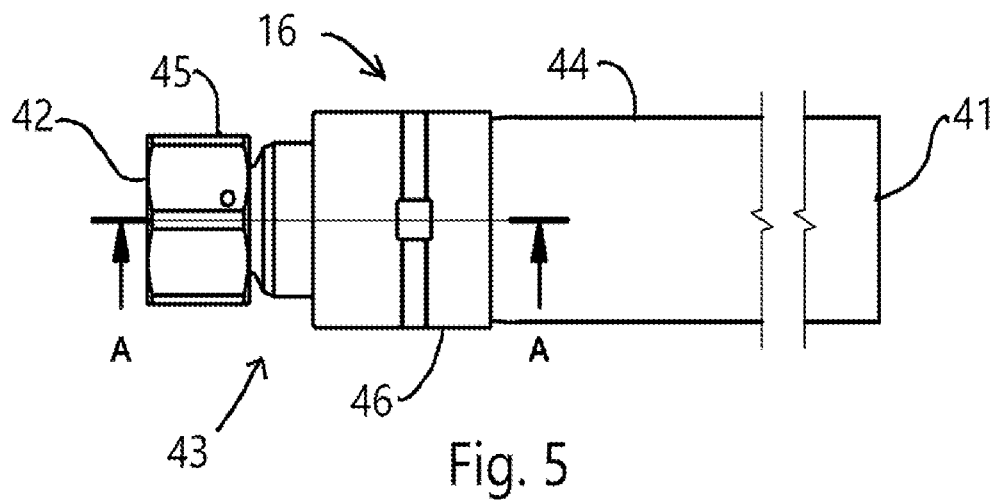
Figure 6:
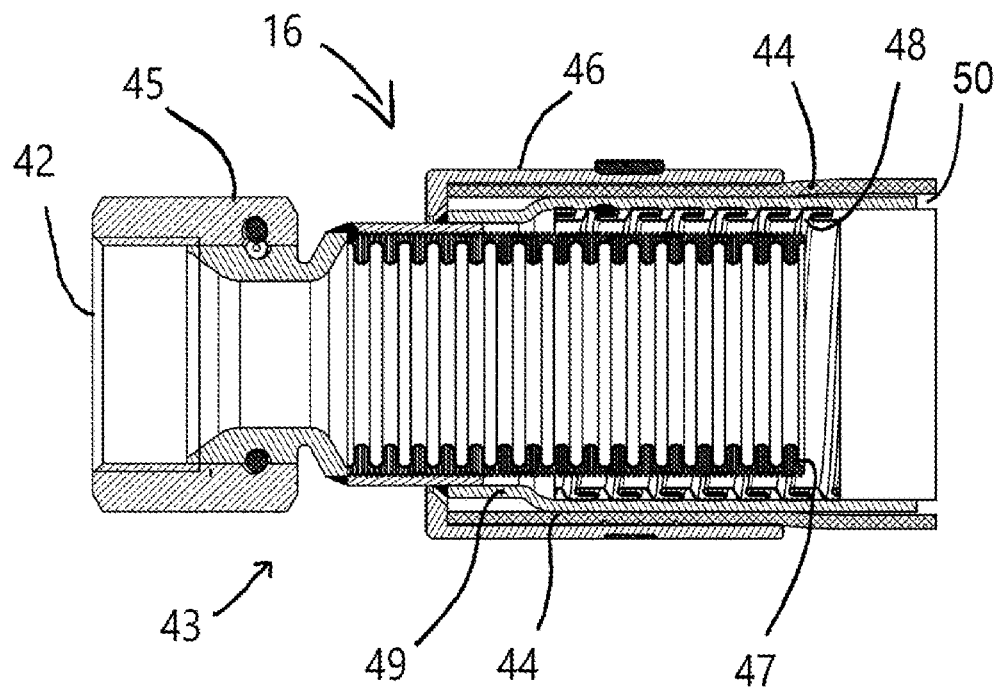

FIG. 5: shows a side view of a hose according to the invention for the passage of a compressed and/or liquefied gas;

FIG. 6: shows a sectional view from the side along the line A-A shown in FIG. 5.

Figure 1:
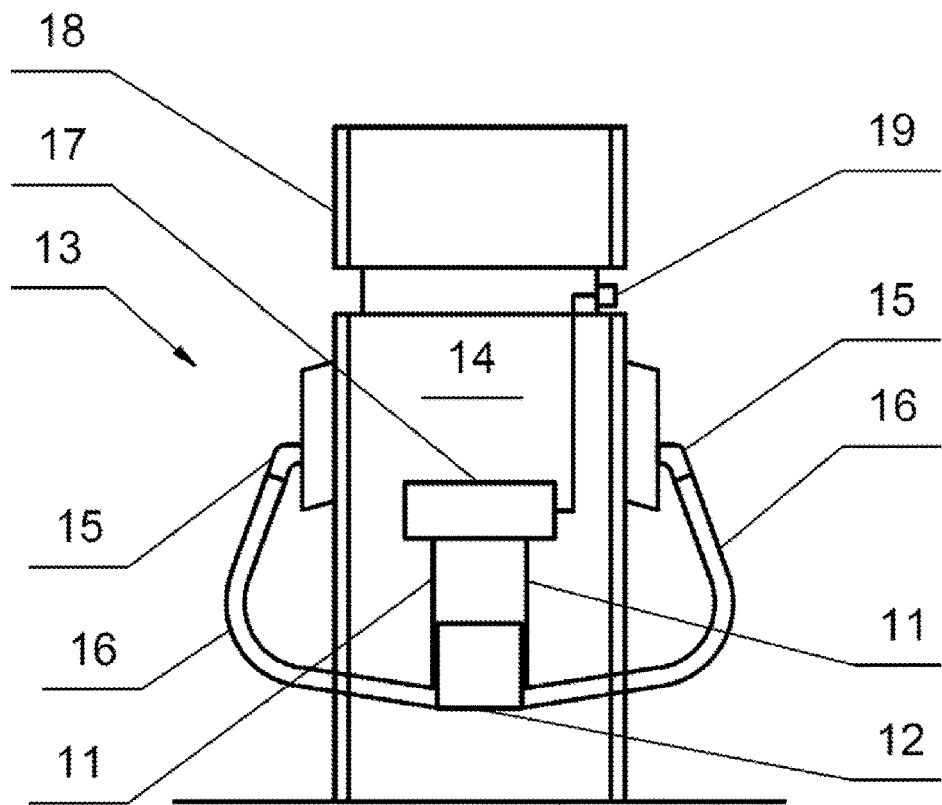

FIG. 1 shows a dispensing system 13 according to the invention for delivering an operating fluid in a schematic side view. In the present case, the operating fluid is an aqueous urea solution (AdBlue®). The system 13 is designed as a dispenser column having a dispenser column housing 14. Respective dispensing valves 15 for dispensing the operating fluid are hung up on each of the two sides of the housing 14. In the housing 14, there is furthermore a conveying device 12, which is connected to the dispensing valves 15 via respective dispensing hoses 16. An operating fluid tank connected to the conveying device 12 can be arranged below the housing 14 (not shown).

Embedded into each of the dispensing hoses 16 is a heating wire, which extends from the end on the dispensing valve side to that end of the dispensing hose 16 which is on the conveying device side. In the region of the conveying device 12, the heating wire is passed out of the dispensing hose 16 and routed via connecting cables 11 to a control unit 17 (illustrated schematically in FIG. 1), which is situated within the housing and configured to supply the heating wire with electric power. A temperature sensor 19 for determining an ambient temperature is arranged in a region below a dispenser column head 18. The temperature sensor 19 is configured to forward temperature data to the control unit 17.

The dispensing hose 16 and the dispensing valves 15 are suitable for operation in an ATEX zone 1. Moreover, the housing 14 is configured to shield the control unit 17 situated therein from an ATEX zone 1 and 2 situated outside the housing 14. The interior of the housing 14 thus forms an installation space of zone-free design. It is therefore possible to set up the dispensing system 13 next to a fuel dispenser column, the immediate surroundings of which are classified as an ATEX zone 1 or ATEX zone 2. Even if it is possible to move the dispensing valve 15 and the dispensing hose 16 into ATEX zone 1 or 2 of the fuel dispenser column, the dispensing system 13 can nevertheless be operated in compliance with ATEX Workplace Directives 1999/92/EC and 2014/34/EU.

Figure 1A:
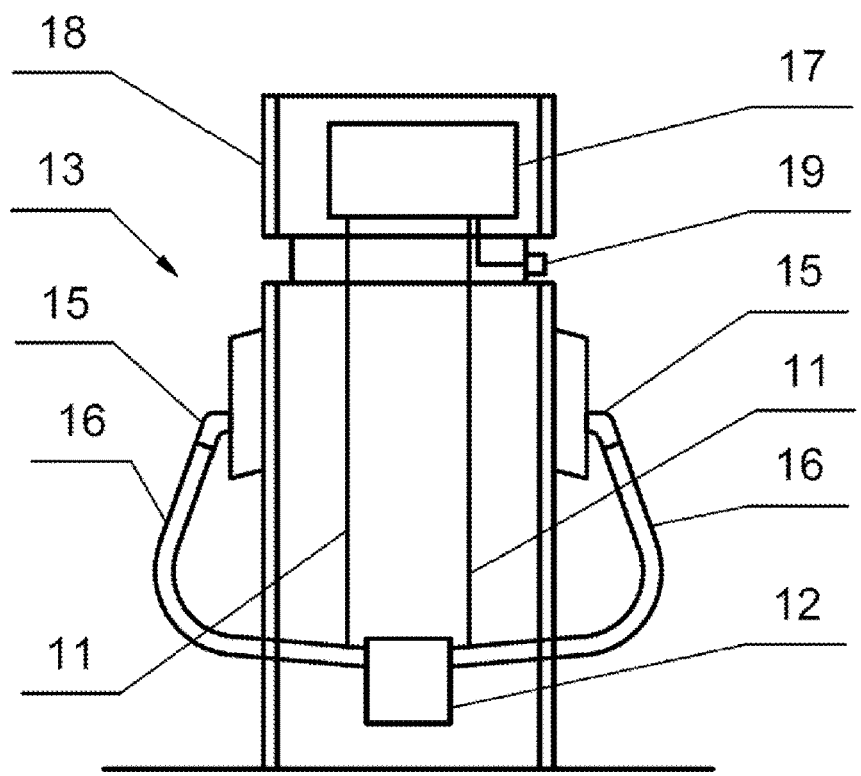

In the alternative embodiment in FIG. 1A, only a partial region of the housing 14, namely the column head 18, is of zone-free design, and the control unit 17 is arranged in this zone-free partial region. In this case, the entire column head 18 forms a zone-free installation space. In alternative embodiments, the installation space of zone-free design can also occupy a partial region of the column head 18 and it is therefore not necessary for the entire column head 18 to be of zone-free design. In the alternative embodiment in FIG. 1B, the control unit 17 is arranged in a zone-free installation space which is situated outside the housing 14. For this purpose, the connecting cables 11 and the temperature sensor 19 are routed to a common terminal 40, which is connected in turn, by corresponding lines 41, to the control unit. The control unit 17 can be situated in an auxiliary building or a separate housing, for example. Apart from the differences described above, the embodiments in FIGS. 1A and 1B are identical with the embodiment in FIG. 1.

In an alternative embodiment, the dispensing system shown in FIG. 1 can also be designed for dispensing LNG. In this case, the conveying device 12 can be configured to output a respective tank filling signal to the control unit 17 at the beginning and on completion of a tank filling process and thus represents a tank filling signal transmitter. As an alternative, it is of course possible to provide a separate tank filling signal transmitter which, for example, monitors the opening of the dispensing valve or the flow through a section of the dispensing system in order to detect the beginning and end of a tank filling process and to output corresponding tank filling signals. In this embodiment, an atmospheric humidity sensor (not shown) connected to the control unit is furthermore provided in addition to the temperature sensor. After receiving the tank filling signal, the control unit 17 supplies the heating wire with electric power, for which purpose it takes account of the atmospheric humidity prevailing in the surroundings as well as the ambient temperature. During the tank filling process, the dispensing hose 16 is heated by the heating wire, making it possible to counteract icing of the dispensing hose 16 in an effective manner. After the end of the tank filling process, the control unit 17 once again receives the tank filling signal and in response ends the power output to the heating wire after the elapse of a predetermined time interval.

FIG. 2 shows a multi-dispenser dispensing system 20 according to the invention, which comprises a dispensing system 13' for delivering an aqueous urea solution, and four dispensing points 21 for delivering a fuel. The multi-dispenser dispensing system 20 has a common housing 22, into which the dispensing points 21 and the dispensing system 13' are integrated. One part 14' of the housing 22 is assigned to the dispensing system 13'. The fuel dispensing points 21 are designed in a manner which is fundamentally known from the prior art. The dispensing system 13' comprises the further elements that have already been described above in connection with FIG. 1, and therefore these are not described again.

Since fuel vapors may escape during the use of the fuel dispensing points 21, the surroundings of the fuel dispensing points 21 are classified as ATEX zone 1 (illustrated by crosshatching in FIG. 2) and as ATEX zone 2 (illustrated by single hatching in FIG. 2). It can be seen that the dispensing hose 16 and the dispensing valve 15 are situated within ATEX zone 2 and at the edge of ATEX zone 1. Within the housing 22 there is an installation space, in which the control unit 17 (not visible in FIG. 2) is arranged, said control unit being designed to output power to the heating wire embedded in the dispensing hose 16. The installation space (not shown in FIG. 2) is spatially separated from the surroundings in such a way that the fuel vapors within the installation space cannot form an explosive atmosphere. The installation space is therefore free from an ATEX zone. The control unit itself is not designed for operation in an ATEX zone but can nevertheless be operated in conformity with the directives by virtue of its positioning within the installation space.

Figure 3:
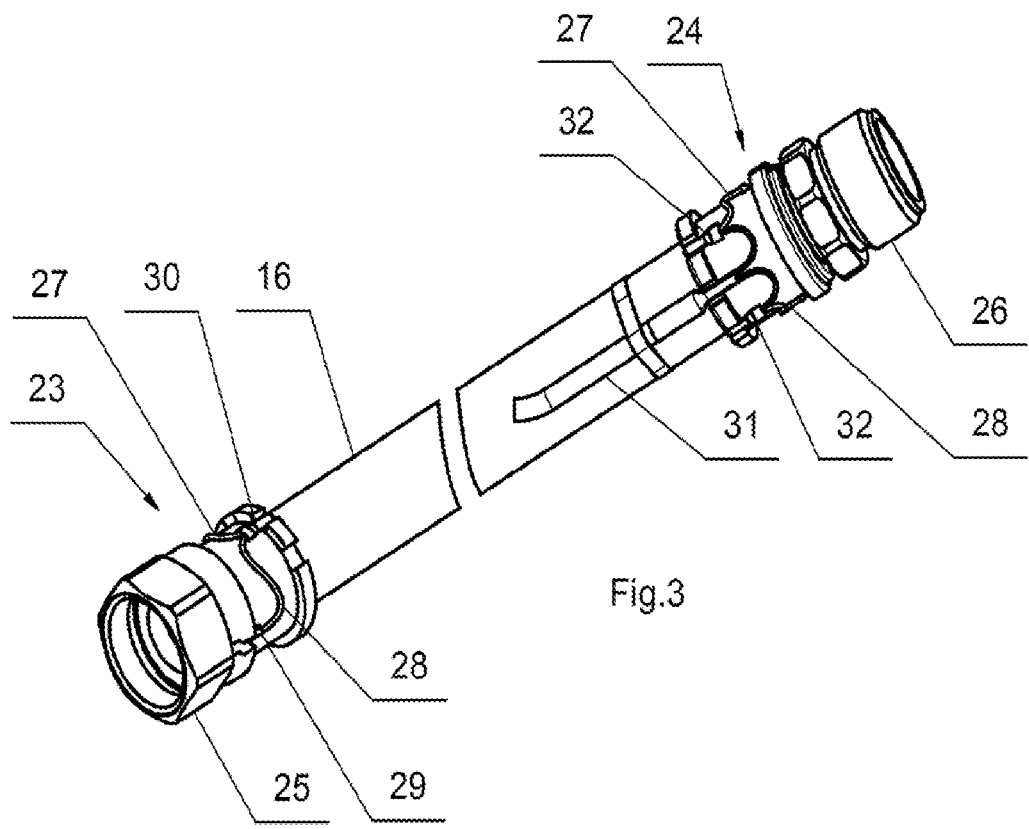
FIG. 3 shows a three-dimensional side view of a dispensing hose of the system according to the invention.

FIG. 3 shows an end 23 on the dispensing valve side as well as an end 24 on the conveying device side of the dispensing hose 16 of a system according to the invention for delivering an operating fluid. At the end 23 on the dispensing valve side of the dispensing hose 16 there is a coupling 25 for connection to the dispensing valve. At the end 24 on the housing side of the dispensing hose 16 there is a coupling 26 for connecting the dispensing hose 16 to the conveying device. In the present case, a heating wire is embedded into the dispensing hose, said wire consisting of a first heating wire section 27 and a second heating wire section 28. The two sections 27, 28 are wound around the central axis of the hose 16 at a distance from one another, running approximately parallel, in the manner of a double helix. In this way, uniform heat distribution can be achieved.

The wire sections 27, 28 are passed out of the hose 16 at the end 23 on the dispensing valve side of the dispensing hose 16, through the respective openings 29 in the hose wall, and are short-circuited to one another by means of a crimp barrel 30.

At the end 24 on the housing side, the wire sections 27, 28 are likewise passed out of the hose 16 via corresponding openings and connected by means of two crimp barrels 32 to a feed line 31, via which a connection to the control unit is established.

Figure 4:
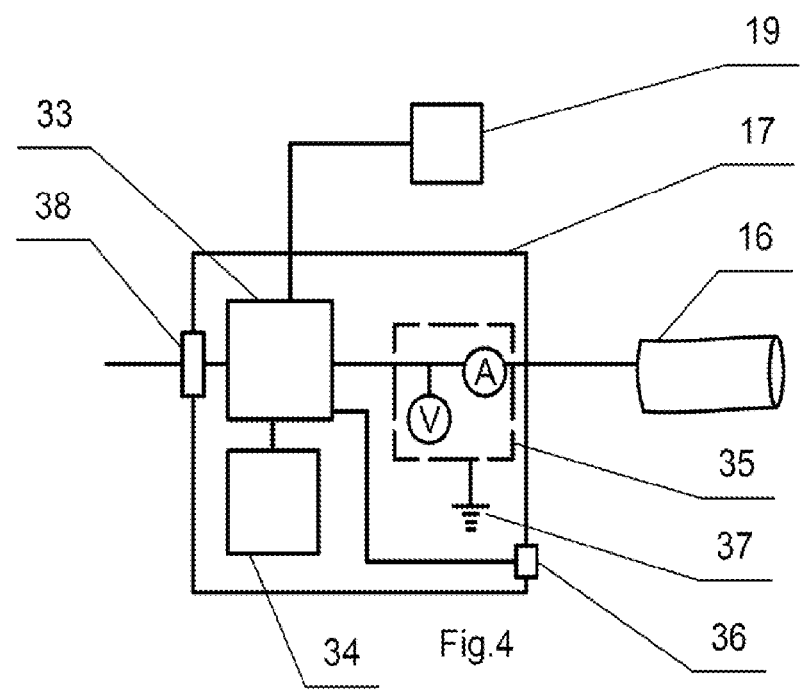
FIG. 4 shows a schematic illustration of a control unit of the system according to the invention.

FIG. 4 shows a schematic illustration of the control unit 17 of the system according to the invention. The control unit 17 comprises a power output module 33, which is designed to determine a power value and to output a corresponding electric power to the heating wire embedded in the heating hose 16. For the supply of electric power, the control unit 17 is connected to a supply network via a galvanic isolation means 38.

The control unit 17 furthermore comprises a database 34, in which power values for different lengths of the dispensing hose 16 and for different ambient temperatures are stored. These power values are designed in such a way that the dispensing hose is heated sufficiently to ensure that the operating fluid flowing through it does not freeze. This configuration is used particularly when the operating fluid is an aqueous urea solution. The control unit furthermore comprises an input device 36 for the initial input of a dispensing hose length.

The power output module 33 receives a temperature value from the temperature sensor 19 at regular time intervals. With the aid of this temperature value and using the initially input dispensing hose length, the power output module 33 takes a suitable power value from the database 34 and then outputs a corresponding power to the heating wire.

In the alternative case where the dispensing system is configured for dispensing LNG, power values for different atmospheric humidity values can additionally be stored in the database 34. In this case, the power values are designed in such a way that the dispensing hose is heated sufficiently to ensure that icing of the dispensing hose due to atmospheric humidity present in the ambient air is prevented or at least reduced. In this case, the power output module, having received the tank filling signal, accesses the database 34, taking into account the ambient temperature, the atmospheric humidity and the initially input dispensing hose length, and takes from said database a suitable power value in order to output a corresponding power to the heating wire.

The control unit 17 furthermore comprises a safety module 35, which is designed to measure a voltage applied to the heating wire, a current flowing through the heating wire, and a fault current flowing from the heating wire to a grounding system 37. The safety module 35 checks at short time intervals whether the measured variables determined correspond to predetermined setpoint variables or deviate from the setpoint variables only within predetermined tolerances. Corresponding setpoint variables are stored in a correlation table, which can be accessed by the safety module. As soon as a deviation outside a tolerance limit is detected, the safety module 35 ends the power output to the heating wire, i.e. a safety shutdown occurs. In addition, the safety module checks at regular time intervals whether the supply voltage provided by the supply network and the temperature determined by the temperature sensor 19 are within predetermined setpoint value ranges. If this is not the case, the safety module likewise ends the power output to the heating wire. Finally, the power output module 33 and the safety module are designed to exchange check signals. As soon as one of the elements—power output module and safety module—no longer receives a check signal from the other element within a predetermined period of time, it switches off the power output to the heating wire.

After a safety shutdown, the safety module 35 activates a fault mode, in which the power output to the heating wire is blocked. Only when the safety module is switched back manually from the fault mode to the normal mode, e.g. by a service technician, can power be output again to the heating wire. In the present case, the security module 35 can be reset to the normal mode via the input device 36. In alternative embodiments, a separate, manual reset button may be provided for resetting.

FIG. 5 shows a side view of a hose 16 according to the invention for passing LNG through. The hose 16 in FIG. 5 can be used in a dispensing system according to the invention. In addition, the hose 16 can be used in an arrangement according to the invention together with the control unit shown in FIG. 4. The hose 16 has an inlet 41 at one end and an outlet 42 at the other. At the outlet 42, there is a coupling part 43, which is designed to establish a connection to a container or to a dispensing valve (not shown). The inlet 41, which can likewise be equipped with a coupling part (not shown here), leads to a conveying device (not shown). LNG conveyed by means of the conveying device can be introduced into the container through the hose 16. A temperature of the LNG conveyed is usually between $-110°$ C. and $-170°$ C. During conveyance, the LNG is usually under a pressure between 7 bar and 15 bar. The LNG is passed through an inner hose 47 of the hose 16 (see FIG. 6). The inner hose 47 is designed for the above temperature and pressure ranges. The hose 16 also has an outer hose 44 surrounding the inner hose 47, which in the present case is designed as a heated hose. This means that a heating wire is routed along the axial direction within the outer hose 44. As in the embodiment in FIG. 3, the heating wire is passed out of the outer hose 44 on the inlet side and on the outlet side, wherein the heating wire is short-circuited on the outlet side and is routed to a control unit (not shown) on the inlet side. Since the configuration and positioning of the heating wire is substantially identical in the embodiments of FIGS. 3 and 5, the heating wire is omitted from FIGS. 5 and 6 for the sake of clarity. The control unit is similar in configuration to the control unit described in connection with FIG. 4 and is likewise not shown again in FIGS. 4 and 5.

The coupling part 43 comprises a fitting 45 and an outer sleeve 46, which tightly encloses the outer hose 44 and thus fixes the hose elements on the coupling piece 43 in a fundamentally known manner. Further details of the configuration of the hose 16 can be seen from FIG. 6, which shows a sectional view from the side along the line A-A shown in FIG. 5.

FIG. 6 shows, in particular, the inner hose 47 of the hose 16. In the present case, the inner hose 47 comprises a corrugated metal hose and a metal braid, which jackets the corrugated metal hose. The metal braid increases the pressure resistance of the inner hose 47. Arranged between the inner hose 47 and the outer hose 44 there is furthermore an intermediate hose 48, which has a plurality of interlocked hose elements and a spiral spring element, which extends in a spiral form around the outer contour of the intermediate hose 48 in a fundamentally known manner. An intermediate hose of this kind can also be referred to as a FloppyGuard™. Two adjacent interlocked hose elements of the intermediate hose 48 can be pivoted relative to one another up to a certain maximum bending angle, and therefore free bending of the hose 16 is possible within a certain angular range. When the maximum bending angle is reached, adjacent hose elements lock and thus prevent further bending of the hose. In alternative embodiments, the intermediate hose can also be designed as a pure spring spiral (i.e. without interlocked hose elements). A spring spiral of this kind likewise serves to limit a maximum bending angle. It has furthermore been found that the intermediate hoses mentioned are a simple way of enabling suitable thermal contact between the inner hose and the outer hose to be established in order to reliably prevent icing of the inner hose and of the outer hose while LNG is being conveyed, with simultaneous activation of the heated hose.

Between the intermediate hose 48 and the outer hose 44 there is furthermore a sleeve 49, which serves to fix the hose elements on the outer sleeve 46. The sleeve 49 extends in the axial direction over a partial region of the hose 16. There is an intermediate space 50 filled with air between the outer hose 44 and the intermediate hose 48, in particular in sections of the hose 16 which are remote from the outer sleeve 46 in the longitudinal direction. In alternative embodiments, the outer hose 44 can also rest directly on the intermediate hose 48.

As the LNG is dispensed, the inner hose 47 cools greatly and assumes a temperature in a range between −110° ° C. and −170° C. The cold is transferred to the outer hose 44 via the intermediate hose 48 and the pressure sleeve 49 or the intermediate space 50, which is filled with air. As the LNG is being dispensed, the control unit is activated in the manner already described above in connection with FIGS. 1 to 4 in order to output electric power to the heating wire. As a result, the outer hose 44 is heated, and the formation of ice on the outer surfaces of the inner hose 47, of the intermediate hose 48 and of the outer hose 44 is reduced or even completely prevented. In this way, the hose 16 remains mobile, thus making it easy for a user to connect the coupling part 43 to a container and to detach it from the latter again after a conveying process. Moreover, the heated hose protects the user from the effects of freezing.

The invention claimed is:

1. A dispensing system (13, 13') for delivering an operating fluid, in particular for delivering an aqueous urea solution or for delivering a compressed and/or liquefied gas, comprising
   a conveying device for the operating fluid,
   a dispensing valve (15) for dispensing the operating fluid, and
   a flexible dispensing hose (16), which connects the conveying device to the dispensing valve (15) in order to allow the dispensing valve (15) to be positioned on a filler neck of a vehicle tank or on an operating fluid container,
characterized in that the dispensing hose (16) has a hose wall into which a heating wire (27, 28) routed along an axial direction of the dispensing hose (16) is embedded, wherein the dispensing hose (16) and the dispensing valve (15) are configured to be operated in a zone 2 according to ATEX Workplace Directive 1999/92/EC, and wherein the dispensing system (13, 13') furthermore has an installation space which is designed to be zone-free, and a control unit (17), which is positioned in this installation space and is configured to output electric power to the heating wire (27, 28) in order to heat an outer surface of the dispensing hose and/or an operating fluid conveyed through the dispensing hose (16); wherein the control unit is furthermore designed to determine a power value taking into account a length of the hose (16) and to output a corresponding power to the heating wire (27, 28).

2. The dispensing system as claimed in claim 1, which is designed to deliver a compressed and/or liquefied gas, wherein the control unit (17) is configured to output electric power to the heating wire (27, 28) in order to heat an outer surface of the dispensing hose (16).

3. The dispensing system as claimed in claim 2, in which the dispensing hose (16) has an inner hose designed for the passage of the compressed and/or liquefied gas, and an outer hose, wherein the outer hose comprises the hose wall into which the heating wire (27, 28) is embedded, wherein the inner hose is designed as a corrugated metal hose, wherein the outer hose is designed as a flexible plastic hose.

4. The dispensing system as claimed in claim 1, which further has a housing (14, 14'), wherein the installation space is arranged within the housing.

5. The dispensing system as claimed in claim 1, in which the heating wire (27, 28) has two wire sections (27, 28), which run along the axial direction of the dispensing hose, which are connected to the control unit (17) on the conveying device side and which are short-circuited to one another on the dispensing valve side, wherein the two wire sections (27, 28) are passed out of the dispensing hose (16) to the outside on the dispensing valve side and are short-circuited to one another outside the dispensing hose (16), wherein both wire sections (27, 28) are passed out of the dispensing hose (16) to the outside on the conveying device side and are routed to the control unit (17) outside the dispensing hose (16).

6. The dispensing system as claimed in claim 1, in particular for delivering a compressed and/or liquefied gas, which furthermore comprises a tank filling signal transmitter for detecting a tank filling process and for outputting a tank filling signal to the control unit (17), wherein the control unit (17) is designed to determine the power value when the tank filling signal is received; and to output the corresponding power to the heating wire (27, 28), wherein the control unit (17) is designed to access a database (34), in which power values for different lengths of the dispensing hose (16) are stored, in order to determine the power value.

7. The dispensing system as claimed in claim 6, which has an atmospheric humidity sensor connected to the control unit (17) and/or a temperature sensor (19), wherein the control unit is designed to take into account a measured temperature and/or a measured atmospheric humidity when determining the power value output to the heating wire.

8. The dispensing system as claimed in claim 1, which furthermore comprises a temperature sensor (19) for determining an ambient temperature of the dispensing system (13, 13'), wherein a signal output of the temperature sensor (19) is connected to the control unit (17), wherein the control unit is designed to determine the power value, taking into account the length of the dispensing hose (16) and the ambient temperature, and to output the corresponding power to the heating wire (27, 28).

9. The dispensing system as claimed in claim 1, in which the control unit (17) has an input device (36) for presetting a length of the dispensing hose (16).

10. The dispensing system as claimed in claim 1, in which the control unit (17) has a safety module (35), which is designed to measure at least one actual electrical variable of the heating wire (27, 28), to determine a deviation between the measured actual variable and a predetermined setpoint variable, and to switch off the power output to the heating wire (27, 28) if the actual variable deviates from the setpoint variable.

11. The dispensing system as claimed in claim 10, in which the safety module (35) has at least one of the following features:
the safety module (35) is configured to determine a supply voltage supplied to the control unit (17) by a supply network and to switch off the power output to the heating wire in the event of a deviation of the determined supply voltage from a setpoint value or a setpoint value range and/or
the safety module (35) is configured to monitor a temperature value determined by a temperature sensor (19) in order to determine an ambient temperature of the dispensing system (13, 13'), and to switch off the power output to the heating wire if the temperature value is outside a predetermined temperature range and/or
the safety module (35) has a normal mode, in which a power output to the heating wire is possible, and a fault mode, in which the power output is blocked, wherein the safety module (35) and/or the control unit are/is designed to switch the safety module from the normal mode to the fault mode after a safety shutdown.

12. The dispensing system as claimed in claim 1, in which the control unit (17) has a power output module (33) and a safety module (35), wherein the power output module (33) and the safety module (35) are designed to exchange check signals, wherein the power output module (33) and/or the safety module (35) are/is designed to switch off the power output to the heating wire if no check signal is received within a predetermined period of time.

13. The dispensing system as claimed in claim 1, which furthermore comprises a thermal fuse that is in thermal contact with the heating wire and is configured to interrupt a current flow through the heating wire if a temperature of the thermal fuse exceeds a limit value, wherein the thermal fuse is located in a region outside a zone 0 according to ATEX Workplace Directive 1999/92/EC.

14. An assembly comprising a fuel dispensing point (21) and a dispensing system (14, 14') as claimed in claim 1 arranged next to the fuel dispensing point (21), wherein the fuel dispensing point (21) has a zone 2 according to ATEX Workplace Directive 1999/92/EC, wherein the dispensing hose (16) and/or the dispensing valve (15) are/is designed to be movable into zone 2, and wherein the control unit (17) is arranged outside a zone according to ATEX Workplace Directive 1999/92/EC.

15. The assembly as claimed in claim 14, which is designed as a multi-dispenser dispensing system (20), wherein the fuel dispensing point (21) and the dispensing system (14') are designed as part of the multi-dispenser dispensing system (20).

16. An assembly comprising a flexible hose (16) for the passage of a medium, and a control unit (17) for outputting electric power, wherein the hose (16) has an inlet (41), an outlet (42) and a hose wall, into which a heating wire (27, 28) routed along an axial direction of the hose (16) is embedded, wherein the control unit (17) is configured to output electric power to the heating wire (27, 28) in order to heat an outer surface of the hose (16) and/or a medium conveyed through the hose (16); wherein the assembly is furthermore designed to determine a power value taking into account a length of the hose (16) and to output a corresponding power to the heating wire (27, 28).

17. The assembly as claimed in claim 16, in which the heating wire (27, 28) has two wire sections (27, 28), which run along the axial direction of the hose, which are connected to the control unit (17) on the inlet side, and which are passed out of the hose (16) to the outside on the outlet side and are short-circuited to one another outside the hose (16).

18. The assembly as claimed in claim 16, wherein the control unit (17) is designed to access a database (34), in which power values for different lengths of the hose (16) are stored, in order to determine the power value.

19. The assembly as claimed in claim 16, which furthermore has a temperature sensor (19) for determining an ambient temperature, wherein a signal output of the temperature sensor (19) is connected to the control unit (17), wherein the control unit is configured to determine the power value, taking into account the ambient temperature, and to output the corresponding power to the heating wire (27, 28), wherein the control unit (17) is designed to access a database (34), in which power values for different ambient temperatures are stored, in order to determine the power value.

20. The assembly as claimed in claim 16, in which the control unit (17) has a safety module (35), which is designed to measure at least one actual electrical variable of the heating wire (27, 28), to determine a deviation between the measured actual variable and a predetermined setpoint variable, and to switch off the power output to the heating wire (27, 28) if the actual variable deviates from the setpoint variable, wherein the actual electrical variable is a current flowing through the heating wire (27, 28) and/or a voltage applied to the heating wire (27, 28) and/or a fault current flowing from the heating wire (27, 28) to a ground system (37), wherein the safety module (35) is designed to access a correlation table, in which respectively associated setpoint variables are stored for different total lengths of the hose (16) and optionally for different ambient temperatures, in order to determine the setpoint variable.

21. The assembly as claimed in claim 16, in which the control unit (17) has a power output module (33) and a safety module (35), wherein the power output module (33) and the safety module (35) are designed to exchange check signals, wherein the power output module (33) and/or the safety module (35) are/is designed to switch off the power output to the heating wire if no check signal is received within a predetermined period of time.

22. The assembly as claimed in claim 16, which furthermore has a conveying signal transmitter, which is designed to detect a conveying process and to output a conveying signal to the control unit (17), wherein the control unit (17) is designed to determine the power value when the conveying signal is received.

23. The assembly as claimed in claim 16, in which the hose (16) has an inner hose (47), which carries the medium, and an outer hose (44), which surrounds the inner hose (47), wherein the outer hose (44) comprises the hose wall into which the heating wire (27, 28) is embedded.

24. The assembly as claimed in claim 23, wherein the medium is a compressed and/or liquefied gas, wherein the inner hose (47) is designed as a corrugated metal hose.

25. The assembly as claimed in claim 16, furthermore comprising:
a conveying device for the medium,
a dispensing valve (15) for dispensing the medium,
wherein the hose (16) connects the conveying device to the dispensing valve (15).

* * * * *